US012176608B2

(12) United States Patent
Sakaida

(10) Patent No.: US 12,176,608 B2
(45) Date of Patent: Dec. 24, 2024

(54) ANTENNA MODULE AND COMMUNICATION DEVICE EQUIPPED WITH THE SAME

(71) Applicant: Murata Manufacturing Co., Ltd., Nagaokakyo (JP)

(72) Inventor: Shun Sakaida, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 128 days.

(21) Appl. No.: 17/884,598

(22) Filed: Aug. 10, 2022

(65) Prior Publication Data

US 2022/0384945 A1 Dec. 1, 2022

Related U.S. Application Data

(63) Continuation of application No. PCT/JP2020/048453, filed on Dec. 24, 2020.

(30) Foreign Application Priority Data

Feb. 19, 2020 (JP) ................................. 2020-026077

(51) Int. Cl.
*H01Q 1/52* (2006.01)
*H01Q 9/04* (2006.01)

(52) U.S. Cl.
CPC ........... *H01Q 1/521* (2013.01); *H01Q 9/0414* (2013.01)

(58) Field of Classification Search
CPC ....... H01Q 21/065; H01Q 9/0414; H01Q 5/35
See application file for complete search history.

(56) References Cited

U.S. PATENT DOCUMENTS

2013/0187830 A1* 7/2013 Warnick ............... H01Q 21/065 343/893
2020/0136269 A1* 4/2020 Choi ...................... H01Q 5/378

FOREIGN PATENT DOCUMENTS

JP 2015-216577 A 12/2015
WO 2019/188413 A1 10/2019
WO 2019/189050 A1 10/2019
WO 2019/208100 A1 10/2019

OTHER PUBLICATIONS

English Translation of the Written Opinion mailed on Mar. 30, 2021, received for PCT Application PCT/JP2020/048453.
International Search Report and Written Opinion mailed on Mar. 30, 2021, received for PCT Application PCT/JP2020/048453, filed on Dec. 24, 2020, 8 pages including English Translation.

* cited by examiner

*Primary Examiner* — David E Lotter
*Assistant Examiner* — Aladdin Abdulbaki
(74) *Attorney, Agent, or Firm* — XSENSUS LLP

(57) ABSTRACT

An antenna module, comprising: a first radiating element having a flat plate shape; a second radiating element having a flat plate-shape, disposed at a position different from a position of the first radiating element in a direction normal to the first radiating element, and having a resonant frequency different from a resonant frequency of the first radiating element; and a first feed line extending from a feed circuit, passing through the second radiating element, and configured to transmit a radio frequency signal to the first radiating element, wherein the first feed line includes, at a position different from a position of the second radiating element in a path from the feed circuit to the first radiating element, a shift region extending in a direction orthogonal to the direction normal to the first radiating element.

20 Claims, 10 Drawing Sheets

(a)

(b)

ANTENNA MODULE AND COMMUNICATION DEVICE EQUIPPED WITH THE SAME

CROSS-REFERENCE TO RELATED APPLICATIONS

The present application is a continuation application of International Patent Application No. PCT/JP2020/048453, filed Dec. 24, 2020, which claims priority to Japanese Patent Application No. 2020-026077, filed Feb. 19, 2020, the entire contents of each of which being incorporated herein by reference.

TECHNICAL FIELD

The present disclosure relates to an antenna module and a communication device equipped with the same and, more particularly, to a technique for improving gain characteristics in a stacked dual-band type antenna module.

BACKGROUND ART

Japanese Unexamined Patent Application Publication No. 2015-216577 (Patent Document 1) discloses a so-called stacked dual-band type antenna module in which a second patch is disposed between a first patch (flat plate-shaped radiating element) and a ground plane and radio waves of different frequencies can be radiated from the two patches. In an example (FIG. 15 of Patent Document 1) of the antenna module disclosed in Japanese Unexamined Patent Application Publication No. 2015-216577 (Patent Document 1), a feed line connected to the first patch is disposed to extend between the first patch and the second patch in a direction along which a distance from a center of the patch increases and then pass through the second patch.

CITATION LIST

Patent Document

Patent Document 1: Japanese Unexamined Patent Application Publication No. 2015-216577

SUMMARY

Technical Problem

In the antenna module disclosed in Japanese Unexamined Patent Application Publication 2015-216577 (Patent Document 1) and including the feed line as described above, capacitive coupling may be generated at a part where the feed line and the second patch face each other, thereby generating unnecessary resonance that does not contribute to radiation. When such unnecessary resonance is generated, energy is consumed by the resonance, and as a result, there is a possibility that gain characteristics of the antenna module are deteriorated.

The present disclosure has been made to solve such a problem, and an object thereof is to suppress unnecessary resonance and suppress deterioration in gain characteristics in a stacked dual-band type antenna module.

Solution to Problem

An antenna module according to an aspect of the present disclosure includes a first radiating element and a second radiating element, which have a flat plate shape, and a first feed line configured to transmit a radio frequency signal to the first radiating element. The second radiating element is disposed at a position different from that of the first radiating element in a direction normal to the first radiating element and has a resonant frequency different from that of the first radiating element. The first feed line extends from a feed circuit, passes through the second radiating element, and configured to transmit a radio frequency signal to the first radiating element. The first feed line includes, at a position different from that of the second radiating element in a path from the feed circuit to the first radiating element, a shift region extending in a direction orthogonal to the direction normal to the first radiating element. In a plan view from the direction normal to the first radiating element, a cavity is formed in a part of the second radiating element, the part overlapping the shift region.

Advantageous Effects

In the antenna module according to the present disclosure, the two radiating elements (the first radiating element and the second radiating element) are disposed to face each other, and the feed line that supplies a radio frequency signal to the first radiating element includes the shift region that extends in the direction orthogonal to the direction normal to the first radiating element. Then, in a plan view, the cavity is formed in the part of the second radiating element overlapping the shift region. With such a configuration, it is possible to suppress capacitive coupling generated between the shift region of the feed line and the second radiating element, and thus unnecessary resonance generated due to the capacitive coupling is suppressed. Thus, it is possible to suppress deterioration in gain characteristics of the antenna module.

DETAILED DESCRIPTION

Figure 1:
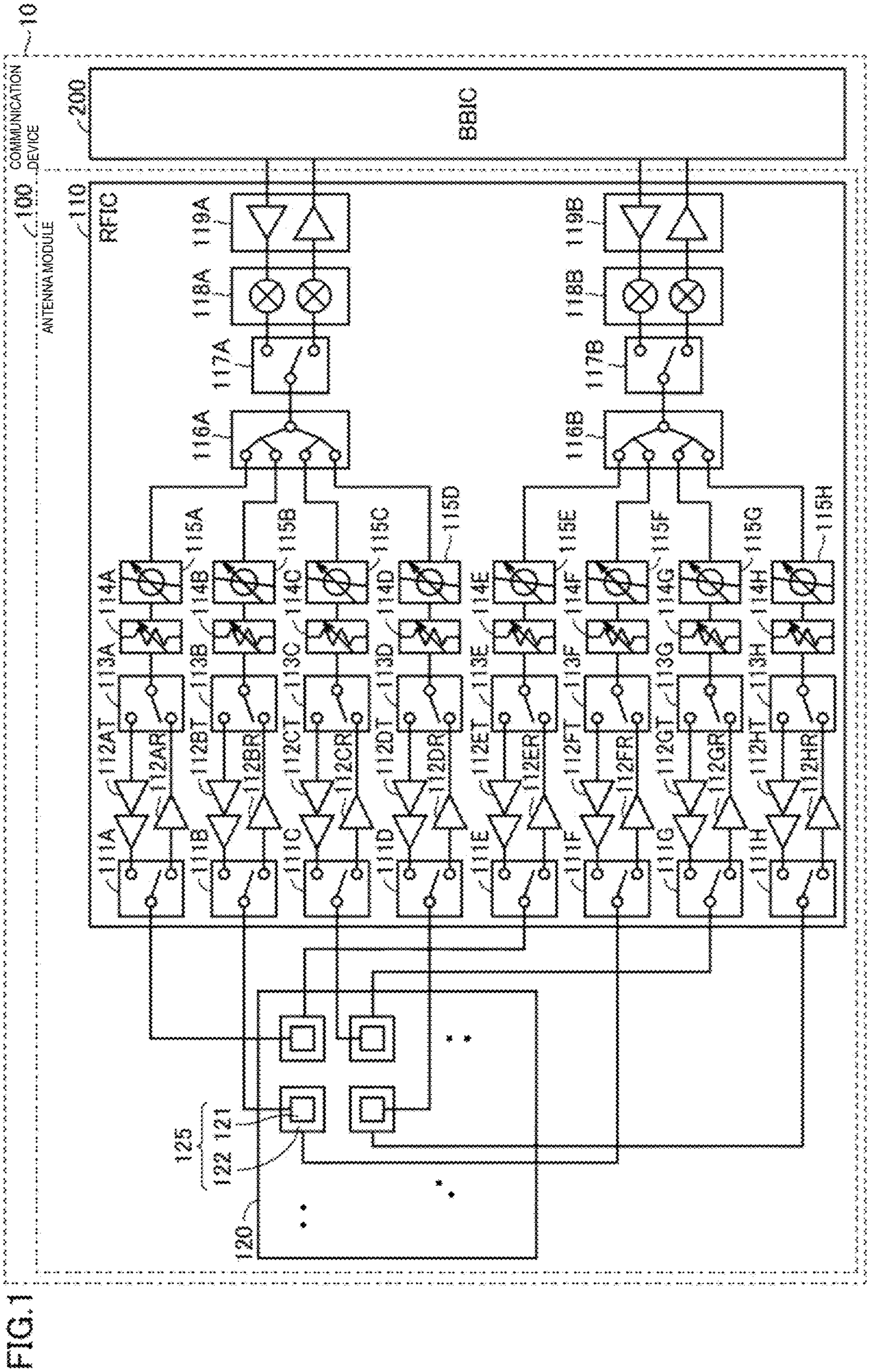
FIG. 1 is a block diagram of a communication device to which an antenna module according to Embodiment 1 is applied.

Hereinafter, embodiments of the present disclosure will be described in detail with reference to the drawings. Note that, in the drawings, the same or corresponding parts are denoted by the same reference numerals, and description thereof will not be repeated.

Embodiment 1

(Basic Configuration of Communication Device)

FIG. 1 is a block diagram of an example of a communication device 10 to which an antenna module 100 according to Embodiment 1 is applied. The communication device 10 is, for example, a mobile terminal such as a mobile phone, a smart phone, or a tablet computer or a personal computer having a communication function. An example of a frequency band of radio waves used in the antenna module 100 according to the present embodiment is a radio wave in a millimeter wave band in which, for example, 28 GHz, 39 GHz, 60 GHz, or the like is a center frequency, but the present disclosure is applicable to radio waves in other than the above frequency band.

Referring to FIG. 1, the communication device 10 includes the antenna module 100 and a BBIC 200 constituting a baseband signal processing circuit. The antenna module 100 includes an RFIC 110, which is an example of a feed circuit, and an antenna device 120. The communication device 10 up-converts a signal transmitted from the BBIC 200 to the antenna module 100 into a radio frequency signal and radiates the radio frequency signal from the antenna device 120 and down-converts a radio frequency signal received by the antenna device 120 and processes the signal in the BBIC 200.

The antenna device 120 in FIG. 1 has a configuration in which radiating elements 125 are disposed in a two-dimensional array. Each of the radiating elements 125 includes two feed elements 121 and 122. The antenna device 120 is a so-called dual-band type antenna device configured to be capable of radiating radio waves in different frequency bands from the respective feed elements 121 and 122 of the radiating element 125. Different radio frequency signals are supplied from the RFIC 110 to the respective feed elements 121 and 122. For example, the frequency band of radio waves radiated from the feed element 121 is 39 GHz, and the frequency band of radio waves radiated from the feed element 122 is 28 GHz.

In FIG. 1, for ease of explanation, only a configuration is illustrated that corresponds to four radiating elements 125 among the plurality of radiating elements 125 constituting the antenna device 120, and a configuration corresponding to another radiating element 125 having a similar configuration is omitted. Note that, the antenna device 120 need not necessarily be a two-dimensional array, and the antenna device 120 may be formed by one radiating element 125. Alternatively, a one-dimensional array may be used in which the plurality of radiating elements 125 are disposed in a line. In the present embodiment, each of the feed elements 121 and 122 included in the radiating element 125 is a patch antenna having a substantially square flat plate shape.

The RFIC 110 includes switches 111A to 111H, 113A to 113H, 117A, and 117B, power amplifiers 112AT to 112HT, low-noise amplifiers 112AR to 112HR, attenuators 114A to 114H, phase shifters 115A to 115H, signal synthesizers/demultiplexers 116A and 116B, mixers 118A and 118B, and amplifier circuits 119A and 119B. Among the above, a configuration of the switches 111A to 111D, 113A to 113D, and 117A, the power amplifiers 112AT to 112DT, the low-noise amplifiers 112AR to 112DR, the attenuators 114A to 114D, the phase shifters 115A to 115D, the signal synthesizer/demultiplexer 116A, the mixer 118A, and the amplifier circuit 119A is a circuit for radio frequency signals in a first frequency band radiated from the feed element 121. Further, a configuration of the switches 111E to 111H, 113E to 113H, and 117B, the power amplifiers 112ET to 112HT, the low-noise amplifiers 112ER to 112HR, the attenuators 114E to 114H, the phase shifters 115E to 115H, the signal synthesizer/demultiplexer 116B, the mixer 118B, and the amplifier circuit 119B is a circuit for radio frequency signals in a second frequency band radiated from the feed element 122.

When a radio frequency signal is transmitted, the switches 111A to 111H are switched to a side of the power amplifier 112AT to a side of the power amplifier 112HT, respectively, and the switches 113A to 113H are switched to a side of the power amplifier 112AT to a side of the power amplifier 112HT, respectively, and the switch 117A is connected to a transmission-side amplifier of the amplifier circuit 119A and the switch 117B is connected to a transmission-side amplifier of the amplifier circuit 119B. When a radio frequency signal is received, the switches 111A to 111H are switched to a side of the low-noise amplifier 112AR to a side of the low-noise amplifier 112HR, respectively, and the switches 113A to 113H are switched to a side of the low-noise amplifier 112AR to a side of the low-noise amplifier 112HR, respectively, and the switch 117A is connected to a reception-side amplifier of the amplifier circuit 119A and the switch 117B is connected to a reception-side amplifier of the amplifier circuit 119B.

A signal transmitted from the BBIC 200 is amplified by the amplifier circuit 119A and up-converted by the mixer 118A or amplified by the amplifier circuit 119B and up-converted by the mixer 118B. A transmission signal, which is an up-converted radio frequency signal, is split into four signals by the signal synthesizer/demultiplexer 116A, the signals pass through corresponding signal paths, and are fed to the respective feed elements 121 different from each other or is split into four signals by the signal synthesizer/demultiplexer 116B, the signals pass through corresponding signal paths, and are fed to the respective feed elements 122 different from each other. By individually adjusting a phase shift degree of each of the phase shifters 115A to 115H disposed in the respective signal paths, directivity of the antenna device 120 can be adjusted.

Reception signals, which are radio frequency signals, received by the respective feed elements 121 are transmitted to the RFIC 110, pass through respective four different paths, and synthesized by the signal synthesizer/demultiplexer 116A, or reception signals received by the respective feed elements 122 are transmitted to the RFIC 110, pass through respective four different signal paths, and synthesized by the signal synthesizer/demultiplexer 116B. A synthesized reception signal is down-converted by the mixer 118A and amplified by the amplifier circuit 119A or down-converted by the mixer 118B and amplified by the amplifier circuit 119B, and the signal is transmitted to the BBIC 200.

The RFIC 110 is formed, for example, as a one-chip integrated-circuit component including the above-described circuit configuration. Alternatively, equipment (switches, power amplifiers, low-noise amplifiers, attenuators, and phase shifters) corresponding to each radiating element 125 in the RFIC 110 may be formed as a one-chip integrated circuit component for each corresponding radiating element 125.

Note that, in a case of a dual-polarization type antenna module in which each feed element can radiate radio waves in two polarization directions, two feed lines are connected from the RFIC 110 to each feed element. Alternatively, one feed line may branch at a branch circuit (not illustrated) to supply a radio frequency signal to each feed point of the feed element.

(Configuration of Antenna Module)

Figure 2:
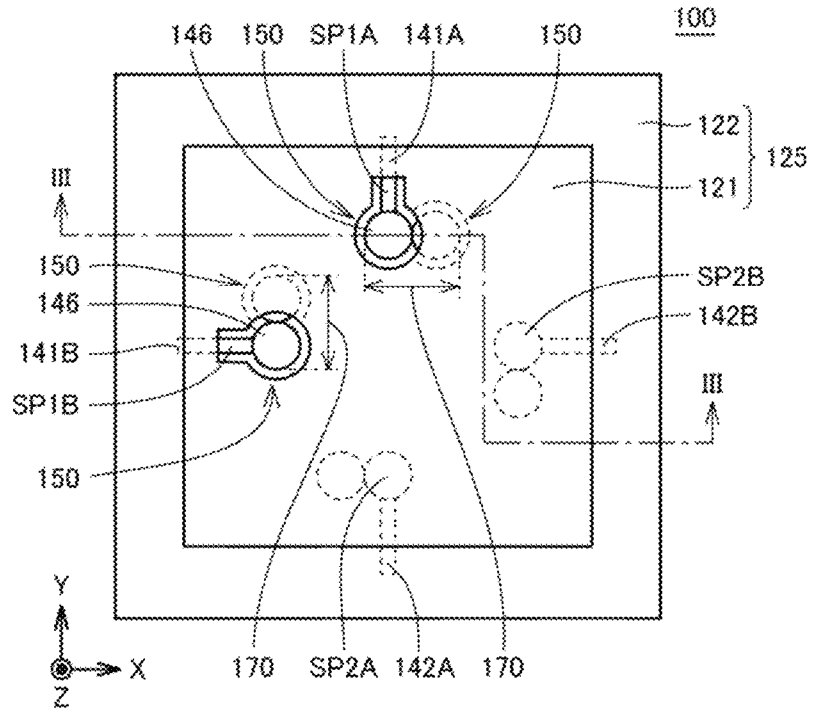
FIG. 2 is a plan view of the antenna module according to Embodiment 1.
Figure 3:
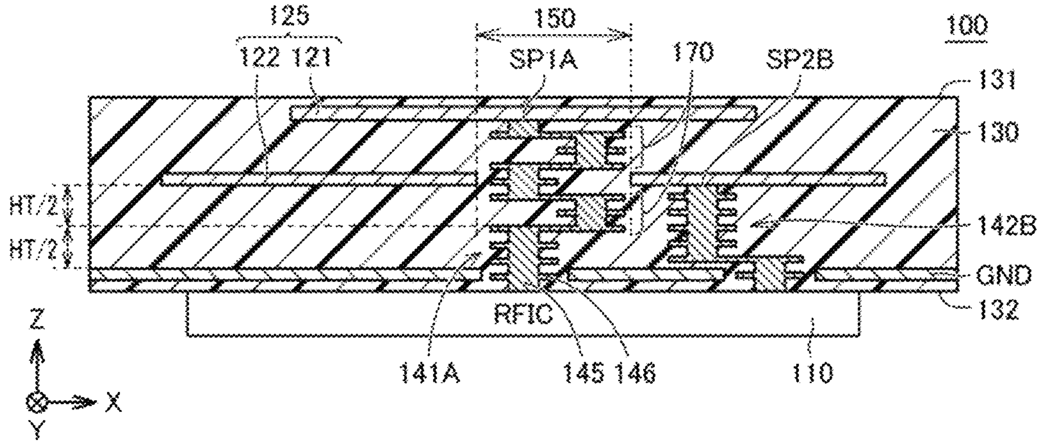
FIG. 3 is a sectional perspective view taken along line III-III in FIG. 2.

Next, the configuration of the antenna module 100 in Embodiment 1 will be described in detail using FIG. 2 and FIG. 3. FIG. 2 is a plan view of the antenna module 100, and FIG. 3 is a sectional perspective view taken along line III-III in FIG. 2. In the following description, for ease of explanation, an antenna module will be described as an example in which one radiating elements 125 is formed. Note that, as illustrated in FIG. 2 and FIG. 3, a thickness direction of the antenna module 100 is defined as a Z-axis direction, and a plane orthogonal to the Z-axis direction is defined by an X-axis and a Y-axis. In addition, a positive direction and a negative direction of the Z-axis in each drawing may be referred to as an upper surface side and a lower surface side, respectively.

Referring to FIG. 2 and FIG. 3, the antenna module 100 includes a dielectric substrate 130, a ground electrode GND, and feed lines 141A, 141B, 142A, and 142B, in addition to the RFIC 110 and the radiating element 125 (feed elements 121 and 122). Note that, in FIG. 2, the RFIC 110, the ground electrode GND, and the dielectric substrate 130 are omitted.

The dielectric substrate 130 is, for example, a low temperature co-fired ceramics (LTCC) multilayer substrate, a multilayer resin substrate formed by laminating a plurality of resin layers made of resin such as epoxy or polyimide, a multilayer resin substrate formed by laminating a plurality of resin layers made of a liquid crystal polymer (LCP) having a lower dielectric constant, a multilayer resin substrate formed by laminating a plurality of resin layers made of a fluorine-based resin, a multilayer resin substrate formed by laminating a plurality of resin layers made of a polyethylene terephthalate (PET) material, or a ceramic multilayer substrate other than the LTCC. Note that, the dielectric substrate 130 need not necessarily have multilayer structure and may be a single-layer substrate. Further, the dielectric substrate 130 may be a housing of the communication device 10.

The dielectric substrate 130 has a substantially rectangular shape in a plan view from a normal direction (the Z-axis direction), and the feed element 121 is disposed on a side of an upper surface 131 (surface in the positive direction of the Z-axis) thereof to face the ground electrode GND. The feed element 121 may be exposed on a surface of the dielectric substrate 130 in an aspect or may be disposed in an inner layer of the dielectric substrate 130 as in the example in FIG. 3.

The feed element 122 is disposed in a layer closer to a side of the ground electrode GND than the feed element 121 is to face the ground electrode GND. In other words, the feed element 122 is disposed in a layer between the feed element 121 and the ground electrode GND. The feed element 122 overlaps the feed element 121 in a plan view of the dielectric substrate 130. A size of the feed element 121 is smaller than a size of the feed element 122, and a resonant frequency of the feed element 121 is higher than a resonant frequency of the feed element 122. That is, a frequency of a radio wave radiated from the feed element 121 is higher than a frequency of a radio wave radiated from the feed element 122. For example, a center frequency of radio waves radiated from the feed element 121 is 39 GHz, and a center frequency of radio waves radiated from the feed element 122 is 28 GHz.

The RFIC 110 is mounted on a lower surface 132 of the dielectric substrate 130 via a solder bump (not illustrated). Note that, the RFIC 110 may be connected to the dielectric substrate 130 using a multi-pole connector instead of the solder connection.

A radio frequency signal is transmitted from the RFIC 110 to the feed elements 121 via the feed line 141A or 141B. The feed line 141A extends from the RFIC 110, passes through the ground electrode GND and the feed element 122, and is connected to a feed point SP1A from a lower surface side of the feed element 121. Similarly, the feed line 141B extends from the RFIC 110, passes through the ground electrode GND and the feed element 122, and is connected to a feed point SP1B from the lower surface side of the feed element 121. In other words, the feed lines 141A and 141B transmit radio frequency signals to the feed points SP1A and SP1B of the feed element 121, respectively.

The feed point SP1A is disposed at a position offset from a center of the feed element 121 in a positive direction of the Y-axis. Further, the feed point SP1B is disposed at a position offset from the center of the feed element 121 in a negative direction of the X-axis. When a radio frequency signal is supplied to the feed point SP1A, a radio wave polarized in a Y-axis direction is radiated from the feed element 121. Further, when a radio frequency signal is supplied to the feed point SP1B, a radio wave polarized in an X-axis direction is radiated from the feed element 121.

In addition, a radio frequency signal is transmitted from the RFIC 110 to the feed element 122 via the feed line 142A or 142B. The feed line 142A extends from the RFIC 110, passes through the ground electrode GND, and is connected to a feed point SP2A of the feed element 122. Similarly, the feed line 142B extends from the RFIC 110, passes through the ground electrode GND, and is connected to a feed point SP2B of the feed element 122. In other words, the feed lines 142A and 142B transmit radio frequency signals to the feed points SP2A and SP2B of the feed element 122, respectively.

The feed point SP2A is disposed at a position offset from a center of the feed element 122 in a negative direction of the Y-axis. Further, the feed point SP2B is disposed at a position offset from the center of the feed element 122 in a positive direction of the X-axis. When a radio frequency signal is supplied to the feed point SP2A, a radio wave polarized in the Y-axis direction is radiated from the feed element 122. Further, when a radio frequency signal is supplied to the feed point SP2B, a radio wave polarized in the X-axis direction is radiated from the feed element 121.

That is, the antenna module 100 is an antenna module of a so-called dual-band type and dual-polarization type capable of radiating radio waves in two different frequency bands and capable of radiating the radio waves in the respective frequency bands in two different polarization directions.

Each of the feed lines 141A, 141B, 142A, and 142B includes an electrode pad 146 formed at a boundary between corresponding dielectric layers and a via 145 that passes through a dielectric layer and connects electrode pads 146 located on upper and lower sides of the dielectric layer. Further, when each feed line extends in the same layer, the electrode pads 146 are connected to each other by a wiring pattern (not illustrated). In the present disclosure, a part of the feed line that extends in a direction orthogonal to a direction normal to the feed element 121 is referred to as a "shift region 170".

Each feed line includes a part (first wiring line) that extends from the RFIC 110, that passes through the ground electrode GND, and that, in a layer between the feed element 122 and the ground electrodes GND, extends to a downside of the feed point corresponding to a center direction of the radiating element and includes a part (second wiring line) that reaches the feed point from the downside of the feed point. The shift region 170 is formed in the second wiring line. Thus, the second wiring line is connected to the feed point while being shifted in a meander shape in the X-axis direction or the Y-axis direction. In the example of the antenna module 100 of Embodiment 1, two shift regions are formed in each of the feed lines 141A and 141B.

In the antenna module 100, the shift region 170 is formed in a direction orthogonal to a direction (polarization direction) extending from the RFIC 110 to the downside of the feed point. For example, the shift region of the feed line 141A is shifted in the X-axis direction, and the shift region of the feed line 142B is shifted in the Y-axis direction. In this manner, forming the shift region in the feed line makes it possible to appropriately adjust impedance mismatching generated at a connection part between the dielectric layers.

As described above, the feed lines 141A and 141B connected to the feed element 121 pass through the feed element 122. In the antenna module 100 of Embodiment 1, in a plan view of the feed element 121, a cavity 150 is formed in a part of the feed element 122 overlapping the shift region 170 of the feed line 141A or 141B.

Figure 4:
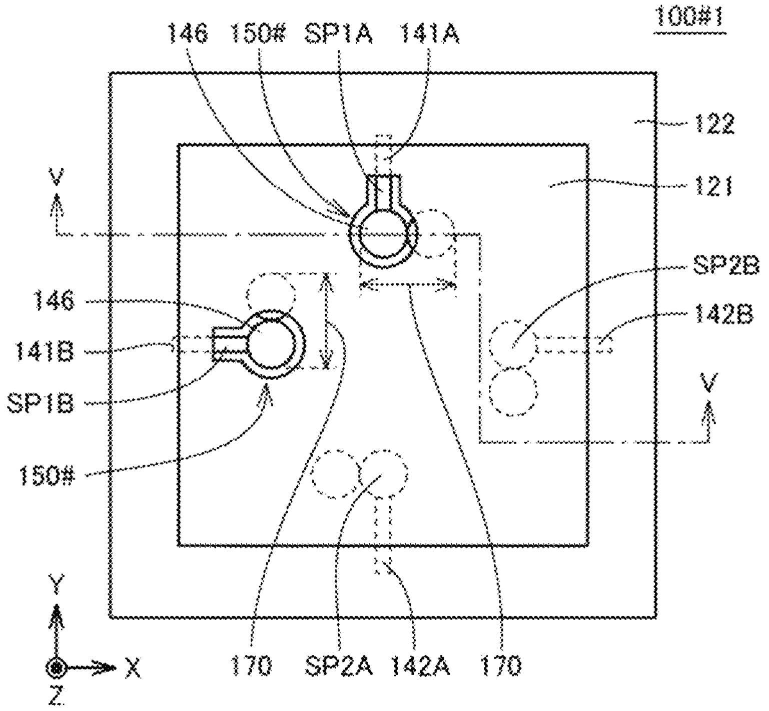
FIG. 4 is a plan view of an antenna module of Comparative Example 1.

Hereinafter, effects of the cavity 150 formed in the feed element 122 will be described using Comparative Example 1 illustrated in FIG. 4 and FIG. 5. FIG. 4 is a plan view of an antenna module 100 #1 of Comparative Example 1. Further, FIG. 5 is a sectional perspective view taken along line V-V in FIG. 4.

Figure 5:
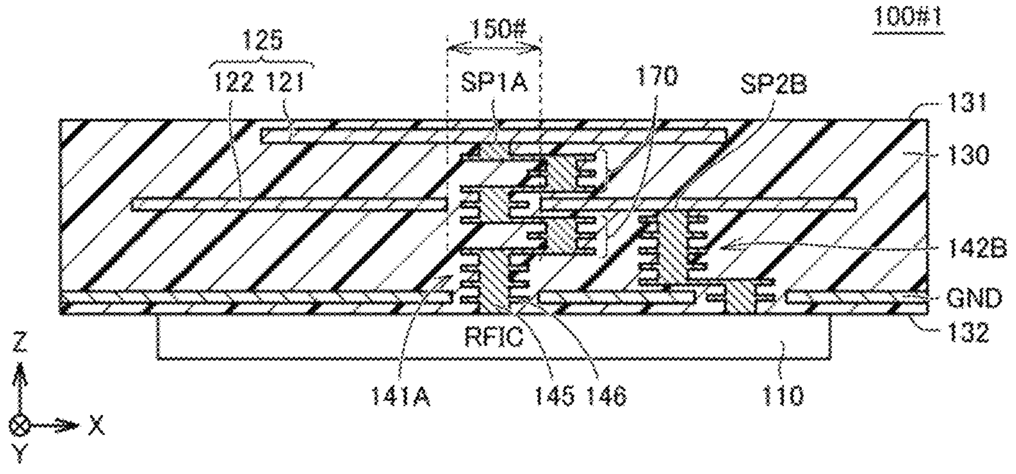
FIG. 5 is a sectional perspective view taken along line V-V in FIG. 4.

Referring to FIG. 4 and FIG. 5, the antenna module 100 #1 of Comparative Example 1 basically has a similar configuration to that of the antenna module 100 of Embodiment 1, except that a cavity 150 #is formed only in a part of the feed element 122 through which the feed line 141A or 141B passes.

In the case of the antenna module 100 #1 of Comparative Example 1, as illustrated in FIG. 5, the shift region 170 is formed above or under the feed element 122 in the feed line 141A or 141B passing through the cavity 150 #of the feed element 122. In a plan view of the antenna module 100 #1 from a normal direction (Z direction), the shift region 170 overlaps the feed element 122. Thus, when a distance between the feed element 122 and the shift region 170 is short, capacitive coupling may be generated between the electrode pad 146 included in the shift region 170 and the feed element 122. When capacitive coupling is generated, unnecessary resonance that does not contribute to radiation from the feed element may be generated. When such unnecessary resonance is generated, energy is consumed by the resonance, and as a result, gain characteristics of the antenna module as a whole may be deteriorated.

On the other hand, in the antenna module 100 of Embodiment 1, in a plan view of the feed element 121, the cavity 150 is formed in the part of the feed element 122 that overlaps the shift region 170. That is, the shift region 170 of the feed line 141A or 141B does not face the feed element 122. Accordingly, capacitive coupling between the shift region 170 and the feed element 122 is suppressed, and thus it is possible to suppress generation of unnecessary resonance as in Comparative Example 1. Thus, it is possible to suppress deterioration in gain characteristics caused by unnecessary resonance.

Figure 6:
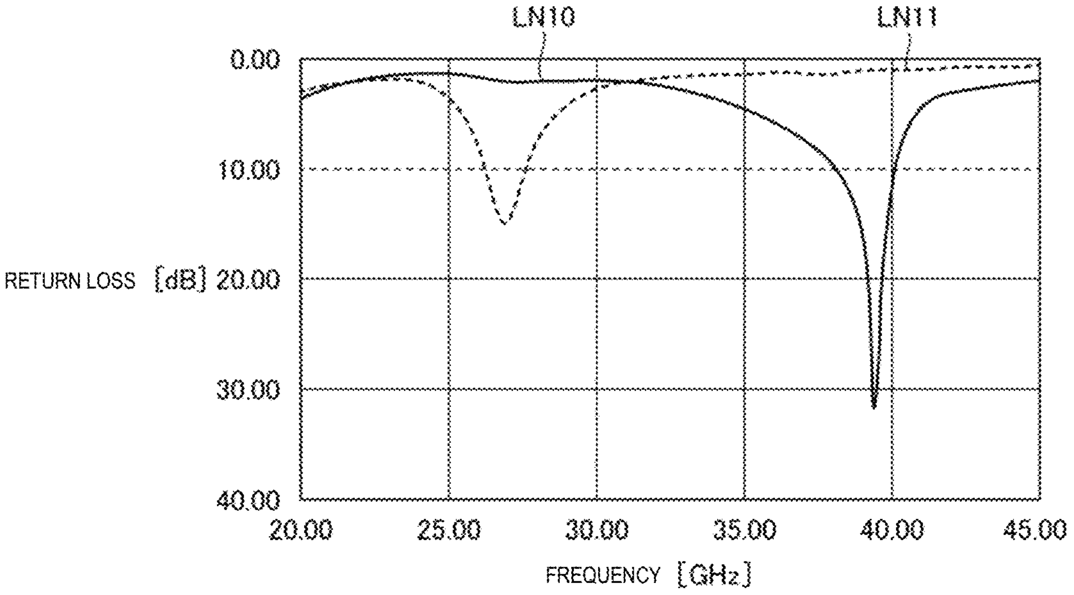
FIG. 6 is a diagram for explaining return loss of the antenna module of each of Comparative Example 1 and Embodiment 1.
Figure 6:
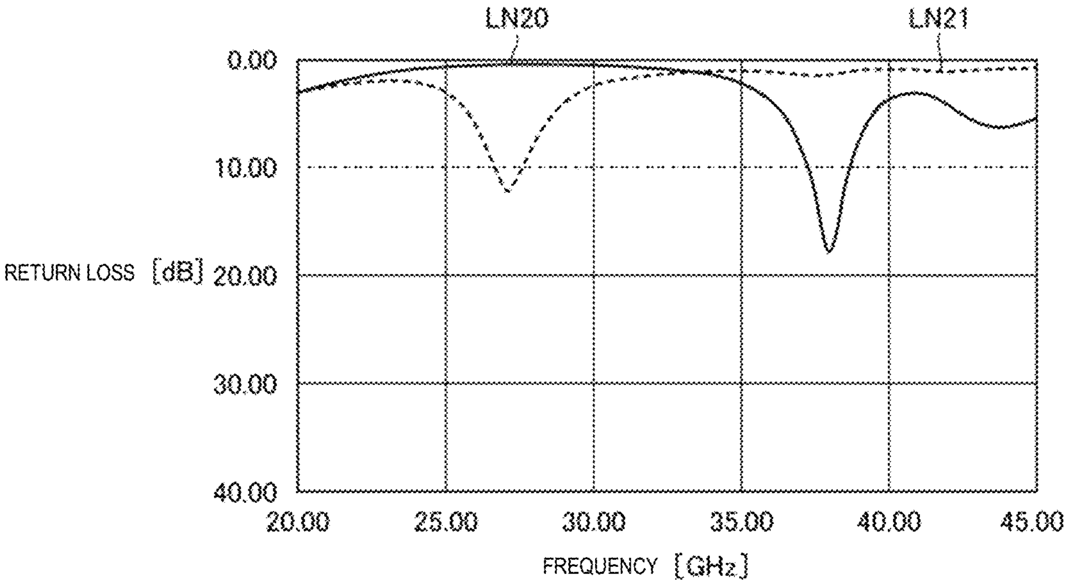
Figure 7:
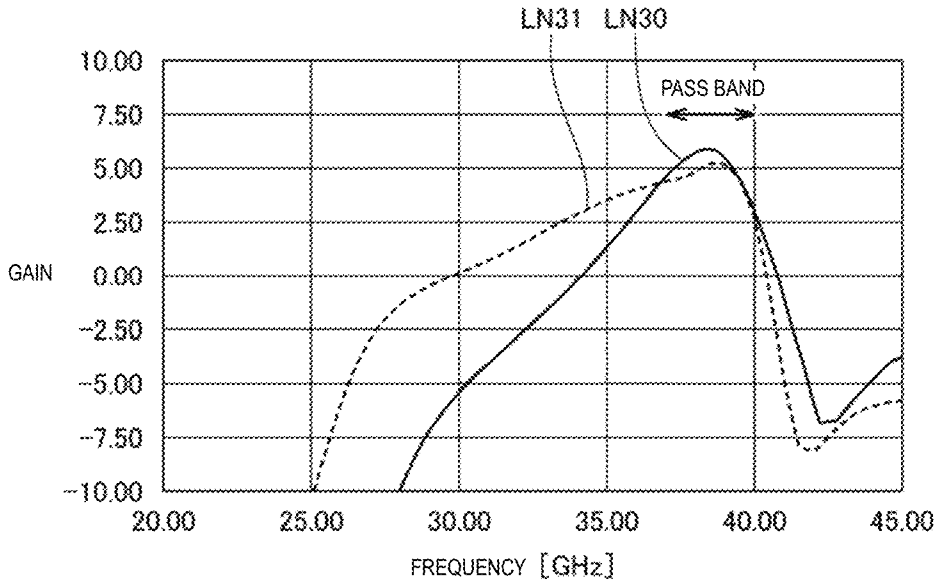
FIG. 7 is a diagram for explaining gain characteristics of a radiating element on a high frequency side in the antenna module of each of Comparative Example 1 and Embodiment 1.

FIG. 6 and FIG. 7 are diagrams for explaining antenna characteristics in the antenna module of each of Comparative Example 1 and Embodiment 1. FIG. 6 is a diagram for comparing return loss of the antenna module of Comparative Example 1 and return loss of the antenna module of Embodiment 1, and FIG. 7 is a diagram for comparing gain characteristics of the feed element 121 in the antenna module 100 of Comparative Example 1 and gain characteristics of the feed element 121 in the antenna module 100 of Embodiment 1. An upper part of FIG. 6 (FIG. 6(*a*)) shows the return loss in the antenna module 100 #1 of Comparative Example 1, and a lower part (FIG. 6(*b*)) shows the return loss in the antenna module 100 of Embodiment 1.

Note that, in FIG. 6, solid lines LN10 and LN20 each indicate the return loss of the feed element 121, and broken lines LN11 and LN21 each indicate the return loss of the feed element 122. In addition, in FIG. 7, a solid line LN30 indicates the gain characteristics in the case of Embodiment 1, and a broken line LN31 indicates the gain characteristics in the case of Comparative Example 1.

Note that, in the antenna module 100 of Embodiment 1, each dielectric sheet constituting the dielectric substrate 130 has a thickness of 50 μm. In addition, in each feed line, a diameter of the via 145 is 100 μm, a diameter of the electrode pad 146 is 240 μm, and a shift amount of the via (via pitch) is 240 μm.

Referring to FIG. 6 and FIG. 7, although there is no significant difference between Comparative Example 1 and Embodiment 1 in the return loss of the feed element 122 on a low frequency side, the return loss of the feed element 121 on a high frequency side is reduced in Comparative Example 1 compared to Embodiment 1. Thus, at a glance, it seems that the antenna module 100 #1 of Comparative Example 1 exhibits better characteristics than the antenna module 100 of Embodiment 1 does.

However, in the gain characteristics in FIG. 7, gain in a desired frequency band is higher in the antenna module 100 of Embodiment 1 than in the antenna module 100 #1 of Comparative Example 1. That is, in the antenna module 100 #1 of Comparative Example 1, although it seems as if the loss of the feed element 121 is reduced from a viewpoint of the return loss due to resonance generated between the feed lines 141A and 142A and the feed element 121, it can be seen that the resonance does not contribute to the gain and conversely incurs a decrease in the gain.

On the other hand, in the antenna module 100 of Embodiment 1, it can be seen that unnecessary resonance is suppressed by forming the cavity 150 in the part of the feed element 122 facing the feed line 141A or 141B, and as a result, a decrease in the gain is suppressed.

As described above, in a stacked dual-band type antenna module, in a plan view of the antenna module, by forming a cavity in a part where a meander-shaped feed line passing through a feed element on a lower surface side and reaching a feed element on an upper surface side overlaps the feed element on the lower surface side, generation of unnecessary resonance between the feed line and the feed element on the lower surface side is suppressed, and it is possible to suppress deterioration in gain characteristics of the feed element on the upper surface side.

Note that, when the shift region 170 of the feed line 141A or 141B is present in a region between the feed element 122 and the ground electrode GND and the shift region 170 is closer to the ground electrode GND than to the feed element 122, the shift region 170 is more likely to be coupled to the ground electrode GND than to the feed element 122. Then, the above-described unnecessary resonance is less likely to be generated. Thus, as illustrated in FIG. 3, it is sufficient that, in a plan view of the antenna module 100, the cavity 150 formed in the feed element 122 is formed in the region overlapping the shift region 170 present on a side closer to the feed element 122 than to a position at ½ of a distance HT between the feed element 122 and the ground electrode GND.

In addition, when a size of the cavity 150 is increased, an electrode portion of the feed element 122 is decreased, which may affect radiation characteristics of the feed element 122. In addition, in a case where the cavity 150 is close to another cavity, there is a possibility that isolation among mutual radio waves deteriorates. Thus, the size of the cavity 150 is preferably equal to or less than 300% of a size of the electrode pad and the wiring pattern in a plan view of the antenna module 100. In the example of Embodiment 1, since a diameter of the cavity 150 is 340 μm while the diameter of the electrode pad is 240 μm, the size of the cavity 150 is about 142% of the size of the electrode pad.

Embodiment 2

In Embodiment 1, the case has been described in which the extension direction of the shift region is the direction orthogonal to the direction (polarization direction) heading from the feed point toward the center of the feed element. In Embodiment 2, a case will be described in which the extension direction of the shift region is parallel to a polarization direction.

Figure 8:
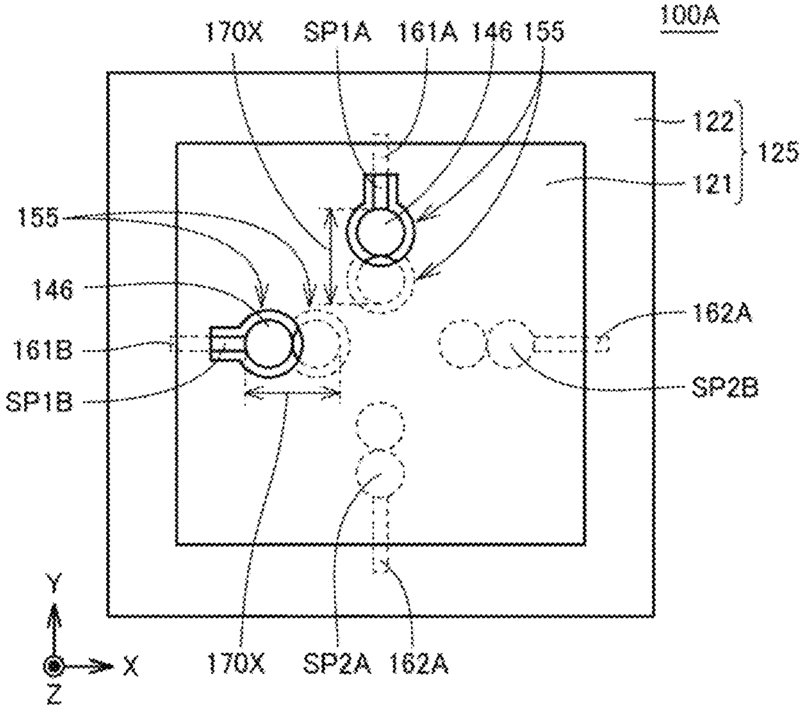
FIG. 8 is a plan view of an antenna module according to Embodiment 2.

FIG. 8 is a plan view of an antenna module 100A according to Embodiment 2. In the antenna module 100A, a shift region 170X in a feed line 161A or 161B for supplying a radio frequency signal to each feed element extends in a direction heading from a corresponding feed point toward a center of a radiating element in a plan view of the antenna module 100A. Then, in a plan view of the antenna module 100A, a cavity 155 is formed in a part of the feed element 122 overlapping the shift region 170X in the feed line 161A or 161B. Other configurations are similar to those of the antenna module 100 of Embodiment 1, and thus detailed description thereof will not be repeated.

Figure 9:
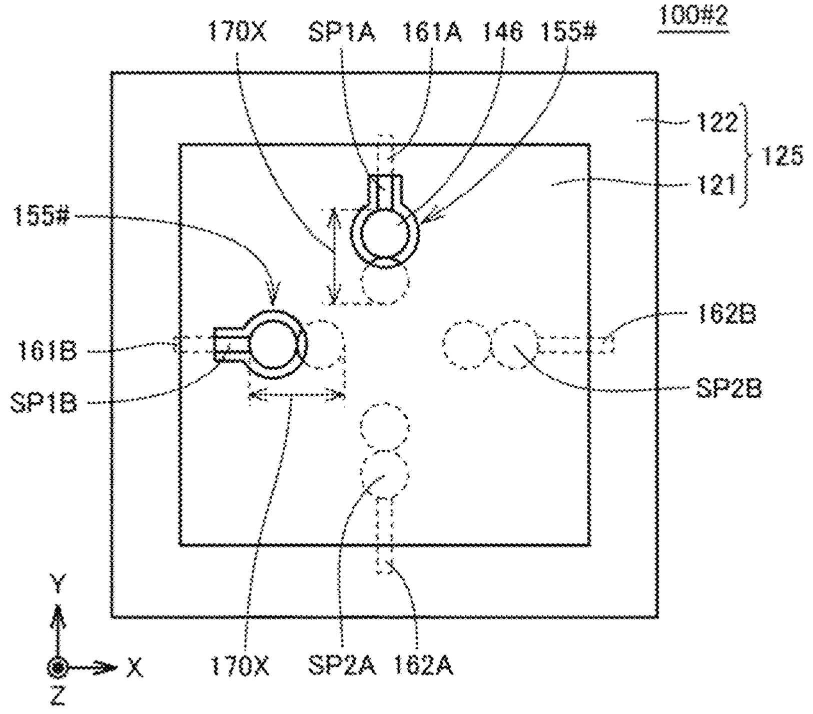
FIG. 9 is a plan view of an antenna module of Comparative Example 2.
Figure 10:
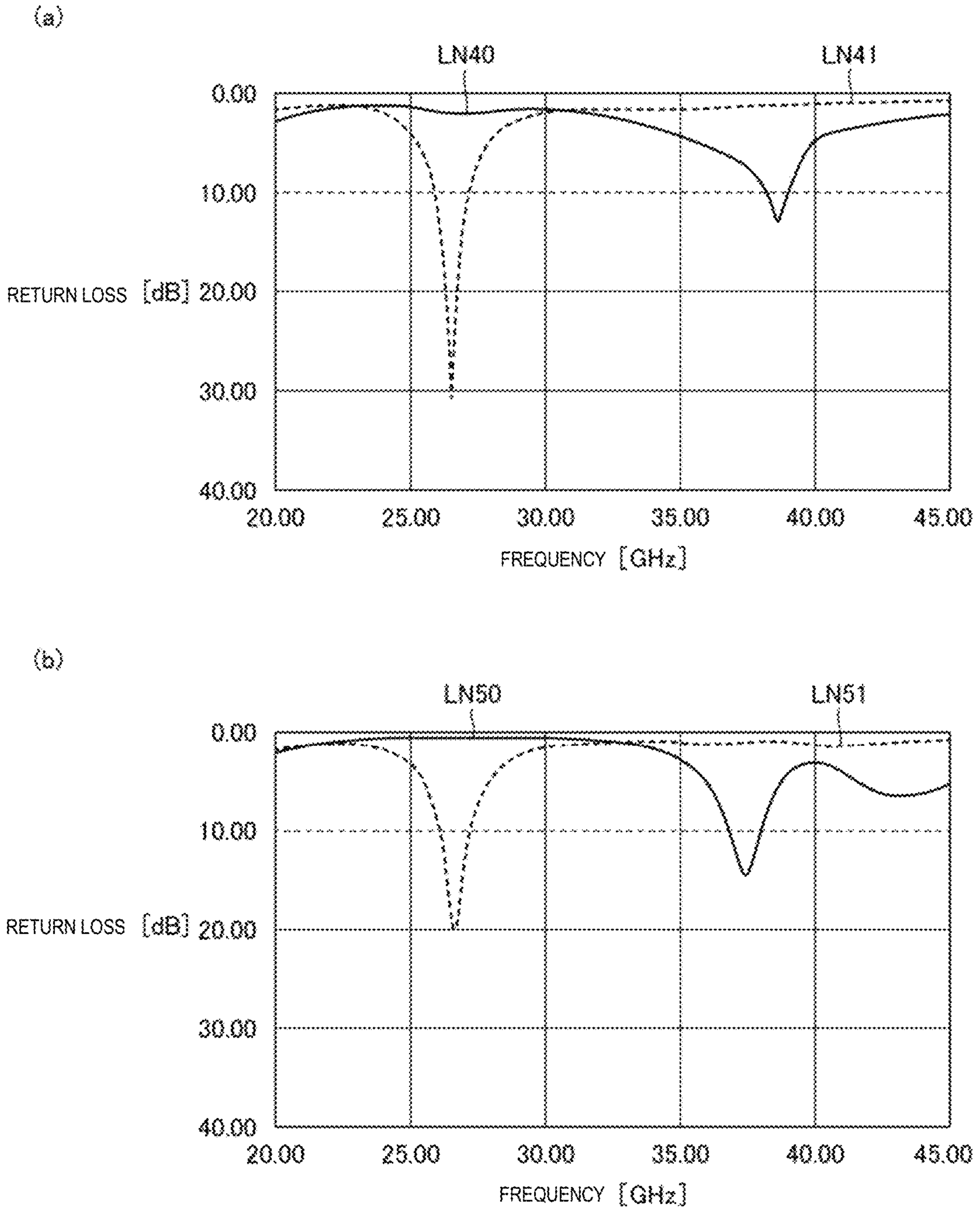
FIG. 10 is a diagram for explaining return loss of the antenna module of each of Comparative Example 2 and Embodiment 2.
Figure 11:
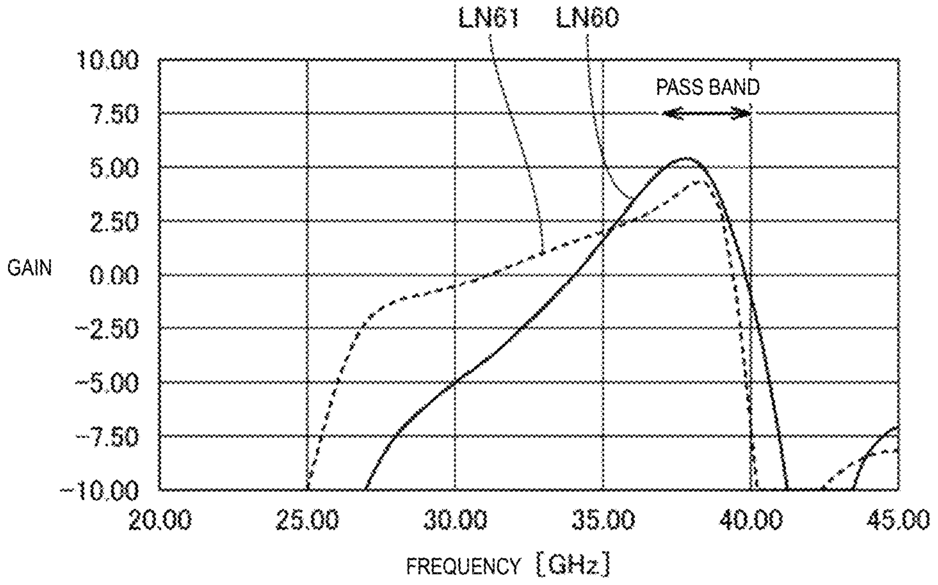
FIG. 11 is a diagram for explaining gain characteristics of a radiating element on a high frequency side in the antenna module of each of Comparative Example 2 and Embodiment 2.

FIG. 10 and FIG. 11 each show a comparison of antenna characteristics in such an antenna module 100A with antenna characteristics in an antenna module 100 #2 of Comparative Example 2 illustrated in FIG. 9. Note that, in the antenna module 100 #2 of Comparative Example 2, a cavity 155 #is formed only in a part where the feed line 161A or 161B passes through the feed element 122.

FIG. 10 is a diagram for comparing return loss of the antenna module of Comparative Example 2 and return loss of the antenna module of Embodiment 2, and FIG. 11 is a diagram for comparing gain characteristics of the feed element 121 in the antenna module of Comparative Example 2 and gain characteristics of the feed element 121 in the antenna module of Embodiment 2. In FIG. 10, similar to FIG. 6, an upper part (FIG. 10(*a*)) shows the return loss in the antenna module 100 #2 of Comparative Example 2, and a lower part (FIG. 10(*b*)) shows the return loss in the antenna module 100A of Embodiment 2. In FIG. 10, solid lines LN40 and LN50 each indicate the feed element 121, and broken lines LN41 and LN51 each indicate the feed element 122. In addition, in FIG. 11, a solid line LN60 indicates the case of Embodiment 2, and a broken line LN61 indicates the case of Comparative Example 2.

Note that, in the antenna module 100A, a thickness of each dielectric sheet constituting the dielectric substrate 130 is 50 μm. In addition, in each feed line, a diameter of the via 145 is 100 μm, a diameter of the electrode pad 146 is 240 μm, and a via pitch is 240 μm.

Referring to FIG. 10 and FIG. 11, in Comparative Example 2, the return loss of the feed element 122 on a low frequency side is reduced compared to the case of Embodiment 2, but the return loss of the feed element 121 on a high frequency side is substantially unchanged. However, a resonance peak in a vicinity of 38 GHz in Comparative Example 2 in FIG. 10(*a*) has an asymmetric shape compared to a resonance peak in Embodiment 2, due to influence of unnecessary resonance.

On the other hand, in the gain characteristics in FIG. 11, gain in a desired frequency band is higher in the antenna module 100A of Embodiment 2 than in the antenna module 100 #2 of Comparative Example 2. That is, similar to the discussion between Embodiment 1 and Comparative Example 1, by forming the cavity 155 in the part of the feed element 122 facing the feed line 161A or 161B, energy consumption due to unnecessary resonance that does not contribute to radiation generated in Comparative Example 2 is suppressed, and as a result, a decrease in gain is suppressed.

As described above, even in a case where an extension direction of a shift region of a feed line is different, in a plan view of an antenna module, by forming a cavity in a part where a shift region in a meander-shaped feed line passing through a feed element on a lower surface side and reaching a feed element on an upper surface side overlaps the feed element on the lower surface side, generation of unnecessary resonance between the feed line and the feed element on the lower surface side is suppressed, and it is possible to suppress a decrease in gain characteristics of the feed element on the upper surface side.

Modifications

In Modifications 1 to 3 that follow, other configuration examples of a feed line connected to the feed element 121 will be described. In addition, in Modification 4, an example of a case will be described in which a radiating element on a low frequency side is a passive element. Note that, in Modifications 1 to 4, only a feed line that radiates a radio wave polarized in the Y-axis direction is illustrated for the feed element 121, however, a feed line that radiates a radio wave polarized in the X-axis direction may be similarly configured.

(Modification 1)

Figure 12:
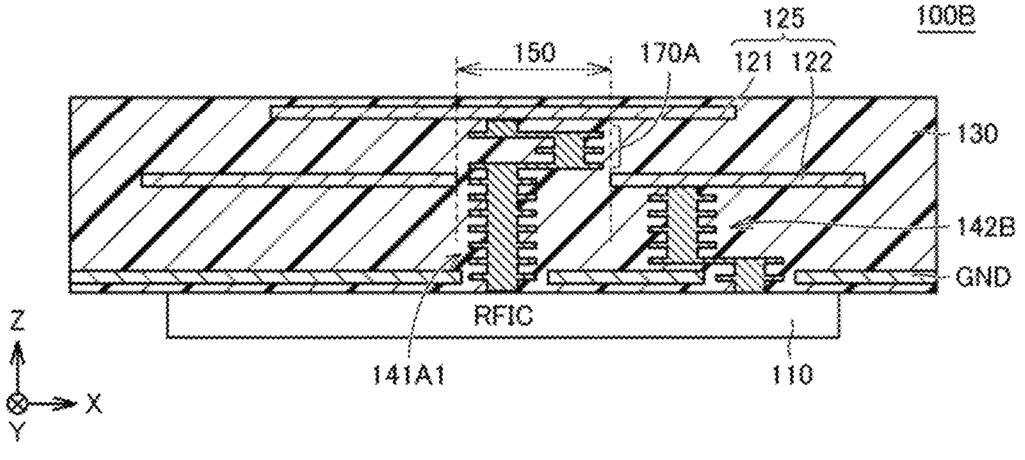
FIG. 12 is a sectional perspective view of an antenna module of Modification 1.

FIG. 12 is a sectional perspective view of an antenna module 100B of Modification 1. In the antenna module 100B, a shift region 170A of a feed line 141A1 for supplying a radio frequency signal to the feed element 121 is formed in a layer between the feed element 121 and the feed element 122. Then, in a plan view of the antenna module 100B, the cavity 150 is formed in a part of the feed element 122 overlapping the shift region 170A. With such a configuration, capacitive coupling between the shift region 170A of the feed line 141A1 and the feed element 122 is suppressed, and unnecessary resonance generated due to the capacitive coupling is suppressed. Thus, it is possible to suppress deterioration in gain characteristics of the antenna module.

(Modification 2)

Figure 13:
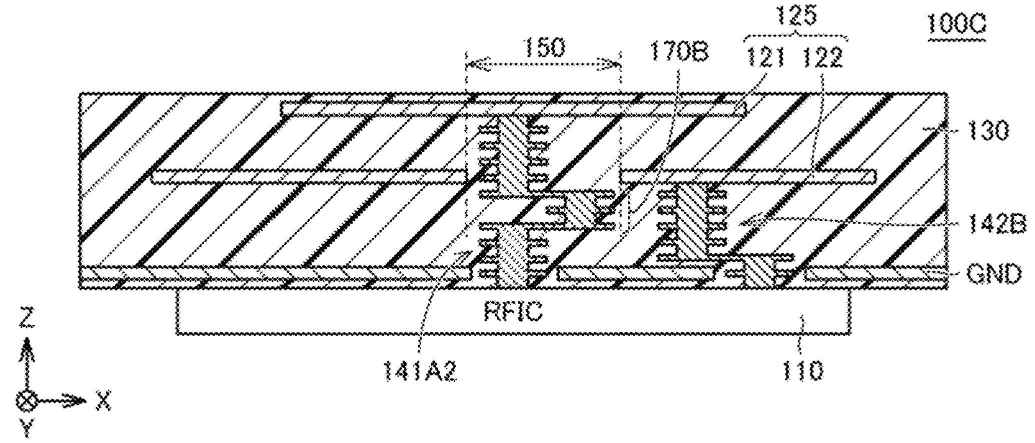
FIG. 13 is a sectional perspective view of an antenna module of Modification 2.

FIG. 13 is a sectional perspective view of an antenna module 100C of Modification 2. In the antenna module 100C, a shift region 170B of a feed line 141A2 for supplying a radio frequency signal to the feed element 121 is formed in a layer between the feed element 122 and the ground electrode GND. Then, in a plan view of the antenna module 100C, the cavity 150 is formed in a part of the feed element 122 overlapping the shift region 170B of the feed line 141A2. With such a configuration, capacitive coupling between the shift region 170B of the feed line 141A2 and the feed element 122 is suppressed, and unnecessary resonance generated due to the capacitive coupling is suppressed. Thus, it is possible to suppress deterioration in gain characteristics of the antenna module.

(Modification 3)

Figure 14:
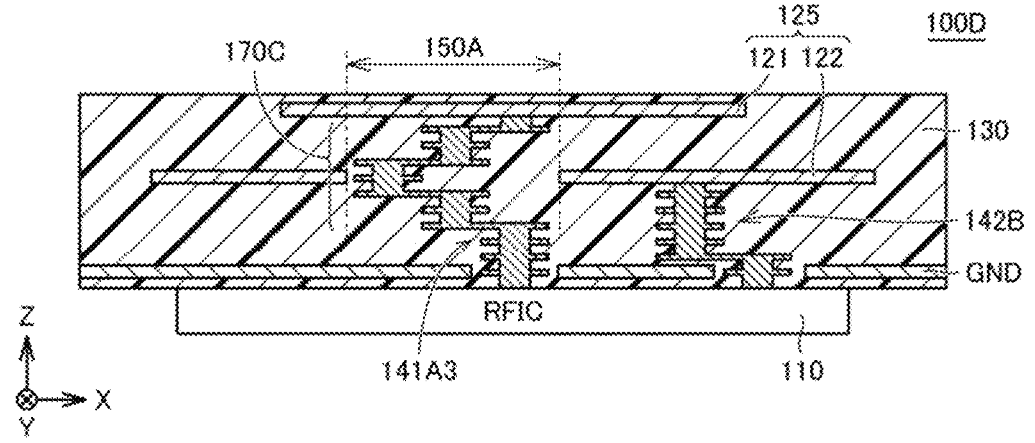
FIG. 14 is a sectional perspective view of an antenna module of Modification 3.

FIG. 14 is a sectional perspective view of an antenna module 100D of Modification 3. In the antenna module 100D, a shift region 170C of a feed line 141A3 for supplying a radio frequency signal to the feed element 121 is formed in a stepped shape. Then, in a plan view of the antenna module 100D, a cavity 150A is formed in a part of the feed element 122 overlapping the shift region 170C of the feed line 141A3. With such a configuration, capacitive coupling between the shift region 170C of the feed line 141A3 and the feed element 122 is suppressed, and unnecessary resonance generated due to the capacitive coupling is suppressed. Thus, it is possible to suppress deterioration in gain characteristics of the antenna module.

(Modification 4)

Figure 15:
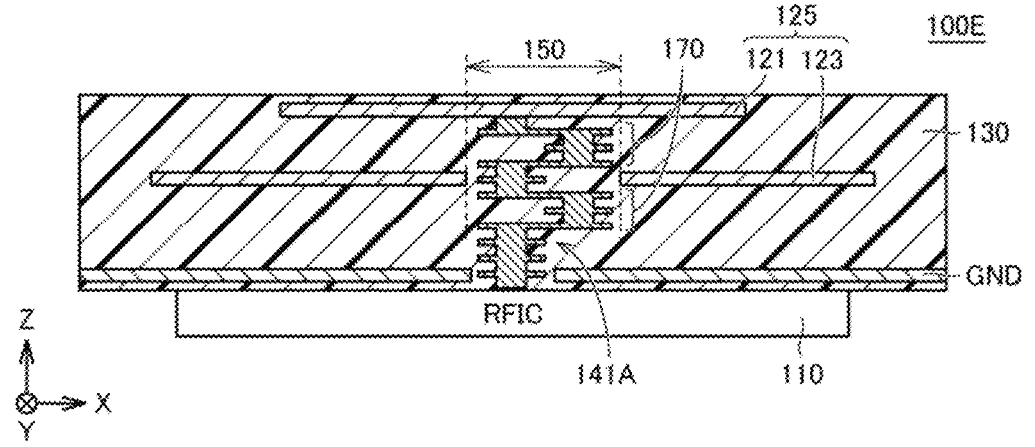
FIG. 15 is a sectional perspective view of an antenna module of Modification 4.

FIG. 15 is a sectional perspective view of an antenna module 100E of Modification 4. In the antenna module 100E, the feed line 141A for supplying a radio frequency signal to the feed element 121 has the same shape as that illustrated in the antenna module 100 in FIG. 3 of Embodiment 1. However, no feed line is connected to a radiating element on a low frequency side disposed in a layer between the feed element 121 and the ground electrode GND, that is, the radiating element is a passive element 123. Then, in a plan view of the antenna module 100E, the cavity 150 is formed in a part of the passive element 123 overlapping the shift region 170 of the feed line 141A.

In the case of the antenna module 100E, by supplying a radio frequency signal corresponding to a resonant frequency of the passive element 123 to the feed line 141A, the feed line 141A and the passive element 123 are electromagnetically coupled with each other at a part where the feed line 141A passes through the passive element 123, and a radio frequency signal is supplied to the passive element 123 in a non-contact manner. Accordingly, a radio wave is radiated from the passive element 123.

In the configuration of the antenna module 100E of Modification 4 as well, in a plan view of the antenna module 100E, the cavity 150 is formed in a part of the passive element 123 overlapping the shift region 170 of the feed line 141A. Thus, when a radio frequency signal corresponding to a resonant frequency of the feed element 121 is supplied to the feed line 141A, capacitive coupling between the shift region 170 of the feed line 141A and the passive element 123 is suppressed. Thus, unnecessary resonance caused by capacitive coupling is suppressed, and it is possible to suppress a decrease in gain characteristics of the antenna module.

Note that, the thickness of the dielectric sheet constituting the antenna module and the dimension of the feed line are not limited to those illustrated in Embodiment 1 and Embodiment 2. In another example, the thickness of the dielectric sheet may be 75 μm, the diameter of the via 145 may be 150 μm, the diameter of the electrode pad 146 may be 290 μm, and the via pitch may be 290 μm. In still another example, the thickness of the dielectric sheet may be 100 μm, the diameter of the via 145 may be 200 μm, the diameter of the electrode pad 146 may be 340 μm, and the via pitch may be 340 μm.

When a thickness of a dielectric sheet is increased, the number of dielectric sheets for forming the dielectric substrate 130 is reduced and the number of steps of laminating the sheets in a manufacturing process is reduced, so that manufacturing costs can be reduced. On the other hand, when the thickness of the dielectric sheet is increased, since it is necessary to increase energy of a laser for irradiating the dielectric sheet when forming a through-hole, a via diameter is increased, and accordingly, an electrode pad diameter and a via pitch are also increased. Then, since a cavity to be formed in a radiating element on a low frequency side is increased, there is a possibility that characteristics of the radiating element on the low frequency side or isolation between two polarized waves is affected. Thus, the thickness of the dielectric sheet is appropriately determined in accordance with manufacturing costs and desired antenna characteristics.

(Modification 5)

Although the configuration has been described in which the two radiating elements (the feed element 121 and the feed element 122, or the feed element 121 and the passive element 123) and the ground electrode GND are formed in the same dielectric substrate 130 in each of the above-described embodiments and modifications, each radiating element and the ground electrode GND may be disposed in different dielectric substrates as in the following respective examples illustrated in FIG. 16 and FIG. 17.

Figure 16:
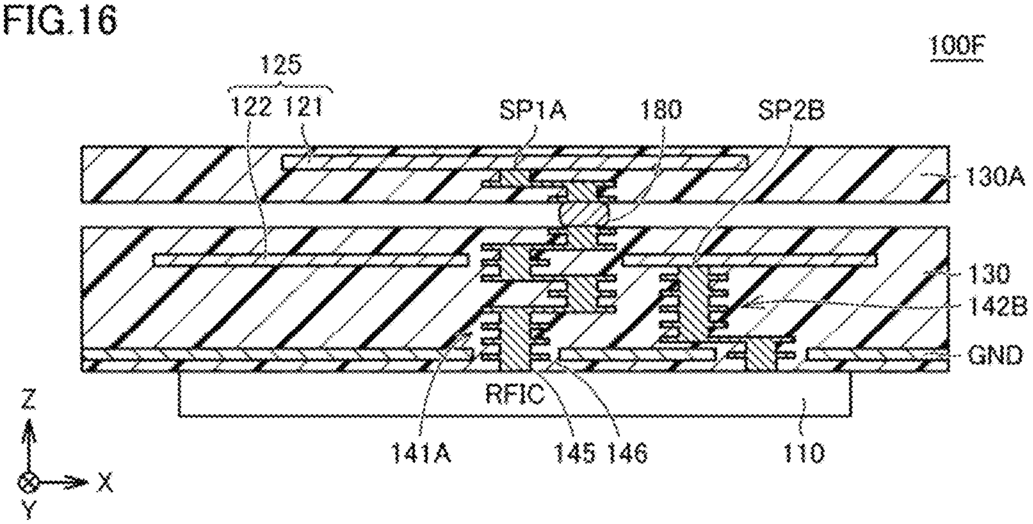
FIG. 16 is a sectional perspective view of an antenna module of a first example of Modification 5.

FIG. 16 is a sectional perspective view of an antenna module 100F of a first example of Modification 5. In the antenna module 100F, the feed element 121 in the antenna module 100 illustrated in FIG. 3 is formed in a dielectric substrate 130A different from the dielectric substrate 130 in which the feed element 122 and the ground electrode GND are formed. The feed line 141A or 141B that transmits a radio frequency signal to the feed element 121 is electrically connected by a solder bump 180 between the dielectric substrate 130 and the dielectric substrate 130A. Note that, instead of the solder bump 180, the feed line may be electrically connected by pressure bonding or an adhesive layer.

Figure 17:
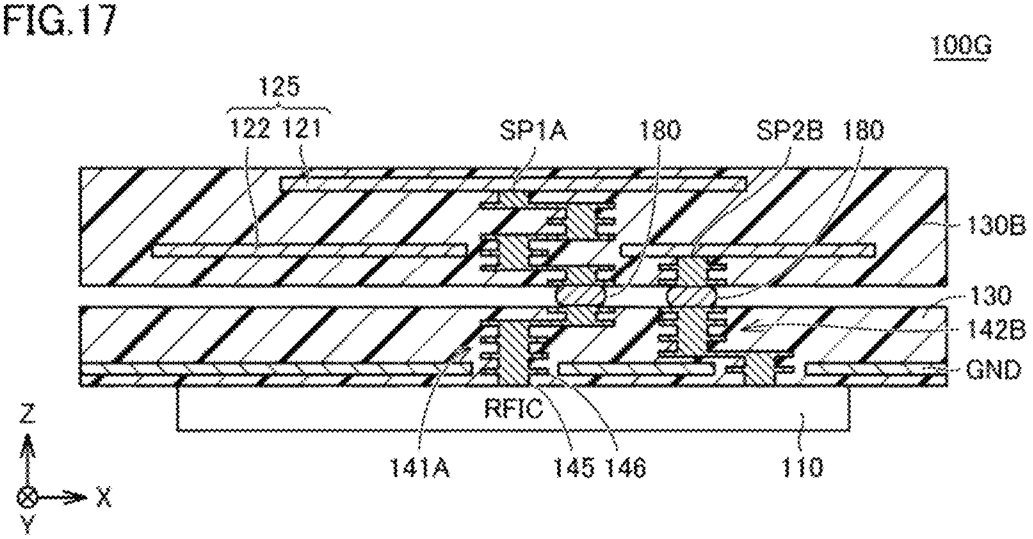
FIG. 17 is a sectional perspective view of an antenna module of a second example of Modification 5.

Further, FIG. 17 is a sectional perspective view of an antenna module 100G of a second example of Modification 5. In the antenna module 100G, the feed elements 121 and 122 in the antenna module 100 illustrated in FIG. 3 are formed in a dielectric substrate 130B different from the dielectric substrate 130 in which the ground electrode GND is formed. The feed line 141A or 141B that transmits a radio frequency signal to the feed element 121 and the feed line 142A or 142B that transmits a radio frequency signal to the feed element 122 are each electrically connected by the solder bump 180 between the dielectric substrate 130 and the dielectric substrate 130B. Note that, instead of the solder bump 180, the feed line may be electrically connected by pressure bonding or an adhesive layer.

Note that, the configurations illustrated in FIG. 16 and FIG. 17 are also applicable to the other configurations of the other embodiments and modifications.

The "feed element 121" in each of the above-described embodiments and modifications corresponds to a "first radiating element" in the present disclosure. Further, the "feed element 122" or the "passive element 123" corresponds to a "second radiating element" in the present disclosure. The "feed line 141 or 161" in each of the embodiments and modifications corresponds to a "first feed line" in the present disclosure. Further, the "feed line 142 or 162" corresponds to a "second feed line" in the present disclosure.

Note that, in the above-described embodiments and each modification, the configuration has been described in which the radiating element and the ground electrode are disposed in the same dielectric substrate, but a configuration may be adopted in which a substrate in which a radiating element is disposed and a substrate in which a ground electrode is disposed are formed of separate substrates.

In addition, in the above-described embodiments and each modification, the configuration has been described in which the feed element 121 and the feed element 122 or the feed element 121 and the passive element 123 face each other, but the feed element 121 and the feed element 122 or the passive element 123 need not overlap each other in a plan view of the dielectric substrate from the normal direction.

Further, the passive element 123 may function as a capacitor that is capacitively coupled to the feed element 121. In this case, the passive element 123 functions as a parasitic element, and thus a frequency band of the feed element 121 can be expanded.

It is to be understood that the embodiments disclosed herein are illustrative and non-restrictive in all respects. The scope of the present disclosure is defined not by the above description of the embodiments but by the claims and is intended to include meanings equivalent to the claims and all modifications within the scope.

The invention claimed is:

1. An antenna module, comprising:

a first radiating element having a flat plate shape;

a second radiating element having a flat plate shape, disposed at a position different from a position of the first radiating element in a direction normal to the first radiating element, and having a resonant frequency different from a resonant frequency of the first radiating element; and a first feed line extending from a feed circuit, passing through the second radiating element, and configured to transmit a radio frequency signal to the first radiating element, wherein the first feed line includes, at a position different from a position of the second radiating element in a path from the feed circuit to the first radiating element, a shift region extending in a direction orthogonal to the direction normal to the first radiating element, the shift region includes:

a first part extending in the direction orthogonal to the direction normal to the first radiating element, a second part connected to the first part and extending in the direction normal to the first radiating element, and a third part connected to the second part and extending in the direction orthogonal to the direction normal to the first radiating element, and in a plan view from the direction normal to the first radiating element, a cavity is formed in a part of the second radiating element, the part overlapping the shift region.

2. The antenna module of claim 1, wherein the second radiating element is disposed to face the first radiating element.

3. The antenna module of claim 2, further comprising:

a ground electrode disposed to face the first radiating element and the second radiating element.

4. The antenna module of claim 3, wherein the second radiating element is disposed between the first radiating element and the ground electrode.

5. The antenna module of claim 4, wherein in the plan view from the direction normal to the first radiating element, the cavity is formed in the part of the second radiating element.

6. The antenna module of claim 5, wherein the part overlapping the shift region is formed closer to a side of the first radiating element than to a position at ½ of a distance between the second radiating element and the ground electrode.

7. The antenna module of claim 6, wherein the shift region is formed between the second radiating element and the ground electrode.

8. The antenna module according to claim 2, wherein the shift region is formed between the first radiating element and the second radiating element.

9. The antenna module of claim 1, further comprising:

a second feed line configured to transmit a radio frequency signal from the feed circuit to the second radiating element.

10. The antenna module of claim 1, wherein the first feed line includes a first wiring line connected to the feed circuit and extending in the direction orthogonal to the direction normal to the first radiating element.

11. The antenna module of claim 10, wherein the first feed line includes a second wiring line extending from the first wiring line and reaching the first radiating element.

12. The antenna module of claim 11, wherein the shift region is formed in the second wiring line in a direction orthogonal to the direction in which the first wiring line extends.

13. The antenna module of claim 11, wherein the shift region is formed in the second wiring line in a direction parallel to the direction in which the first wiring line extends.

14. The antenna module of claim 1, further comprising:

the feed circuit.

15. An antenna module, comprising:

a first radiating element having a flat plate shape;

a second radiating element having a flat plate shape, disposed at a position different from a position of the first radiating element in a direction normal to the first radiating element, and having a resonant frequency different from a resonant frequency of the first radiating element; and a first feed line extending from a feed circuit, passing through the second radiating element, and configured to transmit a radio frequency signal to the first radiating element, wherein the first feed line includes, at a position different from a position of the second radiating element in a path from the feed circuit to the first radiating element, a shift region extending in a direction orthogonal to the direction normal to the first radiating element, and the shift region includes:

a first part extending in the direction orthogonal to the direction normal to the first radiating element, a second part connected to the first part and extending in the direction normal to the first radiating element, and a third part connected to the second part and extending in the direction orthogonal to the direction normal to the first radiating element.

16. The antenna module of claim 15, wherein the second radiating element is disposed to face the first radiating element.

17. The antenna module of claim 16, further comprising:

a ground electrode disposed to face the first radiating element and the second radiating element, wherein the second radiating element is disposed between the first radiating element and the ground electrode.

18. The antenna module of claim 17, wherein in a plan view from the direction normal to the first radiating element, a cavity is formed in a part of the second radiating element.

19. The antenna module of claim 18, wherein the cavity is formed closer to a side of the first radiating element than to a position at ½ of a distance between the second radiating element and the ground electrode.

20. A communication device, comprising:

an antenna module, the antenna module including a first radiating element having a flat plate shape;

a second radiating element having a flat plate shape, disposed at a position different from a position of the first radiating element in a direction normal to the first radiating element, and having a resonant frequency different from a resonant frequency of the first radiating element; and a first feed line extending from a feed circuit, passing through the second radiating element, and configured to transmit a radio frequency signal to the first radiating element, wherein the first feed line includes, at a position different from a position of the second radiating element in a path from the feed circuit to the first radiating element, a shift region extending in a direction orthogonal to the direction normal to the first radiating element, the shift region includes:

a first part extending in the direction orthogonal to the direction normal to the first radiating element, a second part connected to the first part and extending in the direction normal to the first radiating element, and a third part connected to the second part and extending in the direction orthogonal to the direction normal to the first radiating element, and in a plan view from the direction normal to the first radiating element, a cavity is formed in a part of the second radiating element, the part overlapping the shift region.

* * * * *